United States Patent
Konya et al.

(10) Patent No.: US 8,726,356 B2
(45) Date of Patent: May 13, 2014

(54) AUTHENTICATION APPARATUS, AUTHENTICATION METHOD, AND AUTHENTICATION PROGRAM IMPLEMENTING THE METHOD

(75) Inventors: Yuko Konya, Yokosuka (JP); Masahito Kawamori, Yokosuka (JP); Tomokazu Yamada, Yokosuka (JP); Katsuhiko Kawazoe, Yokosuka (JP); Kiyohiko Ishikawa, Setagaya-ku (JP); Arisa Fujii, Setagaya-ku (JP); Syunji Sunasaki, Shibuya-ku (JP); Ganji Eto, Shibuya-ku (JP); Koichi Ishikawa, Shibuya-ku (JP)

(73) Assignees: Nippon Telegraph and Telephone Corporation, Tokyo (JP); Nippon Hoso Kyokai, Tokyo (JP)

( * ) Notice: Subject to any disclaimer, the term of this patent is extended or adjusted under 35 U.S.C. 154(b) by 178 days.

(21) Appl. No.: 12/919,971

(22) PCT Filed: Feb. 28, 2008

(86) PCT No.: PCT/JP2008/053548
§ 371 (c)(1),
(2), (4) Date: Nov. 23, 2010

(87) PCT Pub. No.: WO2009/107219
PCT Pub. Date: Sep. 3, 2009

(65) Prior Publication Data
US 2011/0061098 A1    Mar. 10, 2011

(51) Int. Cl.
H04L 9/32    (2006.01)
(52) U.S. Cl.
USPC .................................. 726/6; 726/8; 713/182
(58) Field of Classification Search
USPC .......................................... 726/5–8; 713/182
See application file for complete search history.

(56) References Cited

U.S. PATENT DOCUMENTS 5,689,638 A    11/1997  Sadovsky
6,687,739 B2 *  2/2004  Anupam et al. ............... 709/204
(Continued)

FOREIGN PATENT DOCUMENTS

EP    0 717 339 A2    6/1996
JP    2002 335239    11/2002
(Continued)

OTHER PUBLICATIONS

"Liberty Architecture Overview Version 1.0" Published Jul. 11, 2002 by the Liberty Alliance Project. (41 pages) http://xml.coverpages.org/liberty-architecture-overview-v10.pdf.*

(Continued)

Primary Examiner — Darren B Schwartz
Assistant Examiner — Thomas Gyorfi
(74) Attorney, Agent, or Firm — Oblon, Spivak, McClelland, Maier & Neustadt, L.L.P.

(57) ABSTRACT

For enabling single sign-on among applications, a linkage ID indicating connection between the authentication apparatus 1 including the client function and the server apparatus 2 is shared among a plurality of applications. For that, a SV information management unit Aa of the authentication apparatus 1 having the client function manages the linkage ID by storing it in a predetermined storing unit. An AP information management unit Ab manages and stores connection information between applications in a predetermined storing unit, wherein the connection information includes an application name corresponding to an application. Then, an AP decision unit determines whether an application name included in a received linkage ID request is registered in the AP information management unit Ab, obtains the linkage ID from the SV information management unit Aa when the application name is registered in the AP information management unit Ab, and returns the linkage ID to a source of the linkage ID request.

8 Claims, 8 Drawing Sheets

(56) References Cited

U.S. PATENT DOCUMENTS

| | | | |
|---|---|---|---|
| 7,089,563 | B2* | 8/2006 | Nagel et al. ............... 719/313 |
| 8,434,137 | B2* | 4/2013 | Lu ............................ 726/9 |
| 2003/0149781 | A1* | 8/2003 | Yared et al. ............... 709/229 |
| 2003/0163733 | A1* | 8/2003 | Barriga-Caceres et al. .. 713/201 |
| 2004/0083259 | A1 | 4/2004 | Tenembaum |
| 2006/0218629 | A1* | 9/2006 | Pearson et al. ............ 726/8 |
| 2007/0184819 | A1* | 8/2007 | Barriga-Caceres et al. .. 455/411 |
| 2007/0220268 | A1* | 9/2007 | Krishnaprasad et al. ..... 713/182 |
| 2008/0209050 | A1* | 8/2008 | Li ............................ 709/227 |
| 2008/0281921 | A1* | 11/2008 | Hunt ......................... 709/206 |
| 2009/0077638 | A1* | 3/2009 | Norman et al. ............ 726/5 |
| 2009/0164581 | A1* | 6/2009 | Bove et al. ................ 709/205 |

FOREIGN PATENT DOCUMENTS

| | | |
|---|---|---|
| JP | 2006 31064 | 2/2006 |
| JP | 2006 178887 | 7/2006 |
| JP | 2007 58391 | 3/2007 |
| JP | 2008 59038 | 3/2008 |

OTHER PUBLICATIONS

"Wings Financial: Enrolling in and Using Enhanced Login Security" Article published Nov. 14, 2006 as verified by the Internet Archive (3 pages) http://web.archive.org/web/20061114104814/http://www.wingsfinancial.com/asp/services/service_4_4.asp.*

"EHow: How to Use Multiple Web Browsers at Once" Article published Jun. 15, 2008 as verified by Internet Archive (3 pages) http://web.archive.org/web/20080615000000*/http://www.ehow.com/how_2033451_use-multiple-web.html.*

"Big Moose Saloon: distinguishing 2 browsers in the same session" Various posts between Jan. 10, 2006 and Jan. 20, 2006 (6 pages) http://www.coderanch.com/t/361931/Servlets/java/distinguishing-browsers-session.*

"Yahoo Answers: Can I use two browsers on one computer?" © 2008 Yahoo Inc. (3 pages) http://answers.yahoo.com/question/index?qid=20080718065640AA7IC3R.*

Extended European Search Report issued Nov. 22, 2011 in patent application No. 08712119.0.

Majima, Keigo: "Research Trend in Services for Portable Terminals", NHK Science and Technical Research Laboratories R&D Report, No. 101, pp. 16-27 (Jan. 15, 2007), (with partial English translation).

Nagano, Ichiro: "Identity Kanri no Genzai to Mirai", Open Enterprise Magazine, vol. 5, No. 10, pp. 56 to 59, (Oct. 1, 2007).

Fujii, Arisa et al., "Digital Hoso Jushinki ni Okeru Ninsho Renkei", 2007 Nendo Dai 3 Kai Seminar Shiryo, [online], Japan PKI Forum, [retrieval date Nov. 14, 2008, Internet<URL :http://www.japanpkiforum.jp/seminar/list_seminar.htm>.

Renkei, Ninsho: "Ichigenka ni Kansuru Kiban Gijutsu Doko Oyobi System Jirei Chosa", PKI-J Journal, 2007 (last issue), [online], Japan PKI Forum, Mar. 2007, pp. 4, 71 to 77, [retrieval date Nov. 14, 2008, Internet<URL :http: //www.japanpkiforum.jp/journal/journal_07/journal2007/pdf>.

\* cited by examiner

AUTHENTICATION APPARATUS, AUTHENTICATION METHOD, AND AUTHENTICATION PROGRAM IMPLEMENTING THE METHOD

TECHNICAL FIELD

The present invention relates to a single sign-on technique in an authentication apparatus.

BACKGROUND ART

Currently, a general HTML (Hyper Text Markup Language) browser can perform session management when connecting to the same site (for example, it is realized by utilizing a technique such as Cookie defined in RFC (Request for Comments) 2965). When the HTML browser connects to a plurality of sites, a plurality of servers that provide the plurality of sites need to perform some processing. For example, if the servers can perform session management, connection to the plurality of sites can be realized (for example, refer to patent document 1).

As conventional technologies that realize single sign-on using a single HTML browser, "Liberty Alliance" is known as a method for managing ID (identifier) in a distributed manner, and ".Net Passport" is known as a method for managing ID in a centralized manner.

[Patent document 1] Japanese Laid-Open patent application No. 2002-335239 (Paragraphs 0053-0058, etc.)

DISCLOSURE OF THE INVENTION

Problem to be Solved by the Invention

An actual user rarely performs a task using only one application. The user may select and use applications from among a plurality of applications based on security requirement and recommendations in the server side.

In addition, in the market, there exit an apparatus, like a broadcast receiver, including a BML (Broadcast Markup Language) browser (an application for displaying broadcast contents) and an HTML browser, and an apparatus, like a mobile phone, including a plurality of browsers such as an HTML browser for mobile phone and a browser (so-called "full browser") for personal computer.

In the above-mentioned conventional techniques, single sign-on is realized in each browser even though a plurality of browsers are included. However, when performing sign-on by each browser, since authentication becomes necessary for each browser, procedures for sign-on increase so that convenience for the user is hampered.

Especially, since the broadcast receiver and the mobile phone are equipped with a browser (BML browser or mobile HTML browser) having functions different from those of the HTML browser, the procedures for sign-on tend to increase. This is because, for example, the BML contents displayed by the BML browser describe a link to HTML contents to be displayed by the HTML browser, thus, there is a site coming and going between the browsers.

The present invention is contrived based on the problem, and an object is to provide an authentication apparatus, an authentication method, and an authentication program implementing the method for performing single sign-on among applications in a client apparatus.

Means for Solving the Problem

For solving the problem, the present invention is configured as an authentication apparatus, including a client function in a network, in which a plurality of applications for performing single sign-on to a server apparatus are installed, including:

a linkage ID sharing unit configured to share a linkage ID, among the applications, indicating connection between the authentication apparatus including the client function and the server apparatus.

According to the present invention, in the authentication apparatus in which a plurality of applications are loaded, single sign-on can be performed among the plurality of applications.

In the authentication apparatus, the linkage ID sharing unit may include:

a SV information management unit configured to store the linkage ID in a SV information storing unit;

an AP information management unit configured to store connection information between applications in an AP information storing unit for at least one of the plurality of applications, wherein the connection information includes an application name of an application different from the at least one of the plurality of applications; and an AP decision unit configured to determine whether an application name included in a received linkage ID request is stored in the AP information storing unit, obtain the linkage ID from the SV information storing unit when the application name is stored in the AP information storing unit, and return the linkage ID to a source of the linkage ID request.

According to this configuration, the linkage ID can be returned only to an application stored in the AP information management unit, so that applications for sharing the linkage ID can be limited.

In the authentication apparatus, the SV information management unit, the AP information management unit and the AP decision unit may be shared by the plurality of applications. Accordingly, the linkage ID can be managed by a common unit common to a plurality of applications.

The server apparatus may include a single sign-on function providing unit configured to issue the linkage ID, and the authentication apparatus may include:

a unit configured to send an authentication request to the single sign-on function providing unit; and a unit configured to receive the linkage ID from the single sign-on function providing unit when the single sign-on function providing unit succeeds in authentication for the authentication request.

The present invention may be also configured as an authentication method in which a plurality of applications are installed in an apparatus having a client function in a network, and the installed applications perform single sign-on to a server apparatus, including:

a linkage ID sharing step of sharing a linkage ID, among the applications, indicating connection between the authentication apparatus including the client function and the server apparatus.

In the above-mentioned configuration, the linkage ID sharing step may include:

a SV information management step of storing the linkage ID in a SV information storing unit;

an AP information management step of storing connection information between applications in an AP information storing unit for at least one of the plurality of applications, wherein the connection information includes an application name of an application different from the at least one of the plurality of applications; and an AP decision step of determining whether an application name included in a received linkage ID request is stored in the AP information storing unit, obtaining the linkage ID from the SV information storing unit when the application name is stored in the AP information storing unit, and returning the linkage ID to a source of the linkage ID request.

The authentication method may include a step of using, commonly by the plurality of applications, the SV information management step, the AP information management step and the AP decision step.

In addition, the present invention can be configured as a program that causes a computer to function as function units of the authentication apparatus.

Effect of the Invention

According to the present invention, in an authentication apparatus in which a plurality of applications are loaded, single sign-on can be performed among the plurality of applications. In addition, since single sign-on is not performed by each application, convenience of the user can be improved. In addition, the present invention can contribute to technical fields of network services.

DESCRIPTION OF REFERENCE SIGNS 1 client apparatus
2 server apparatus
2a authentication information management unit
2b linkage ID management unit
2c authentication unit
2d ID search unit
2e receiving unit
2f contents unit
10 single sign-on function providing server
20 service providing server
A, B application
Aa, Ba, a SV information management unit
Ab, Bb, b AP information management unit
Ac, Bc, c AP launch unit
Ad, Bd, d AP decision unit
Ae, Be, e AP information registration unit

PREFERRED EMBODIMENTS FOR CARRYING OUT THE INVENTION

In the following, an embodiment of the present invention is described in detail based on drawings and the like. First, a configuration of an authentication system in the present embodiment is described with reference to FIG. 1. Basically, the authentication system of the present embodiment includes a client apparatus (that is, an authentication apparatus in the present embodiment; personal computer, for example) 1, a server apparatus (server computer, for example) 2, a communication line connecting between the client apparatus 1 and the server apparatus 2 (a network such as the Internet, for example).

Figure 1:
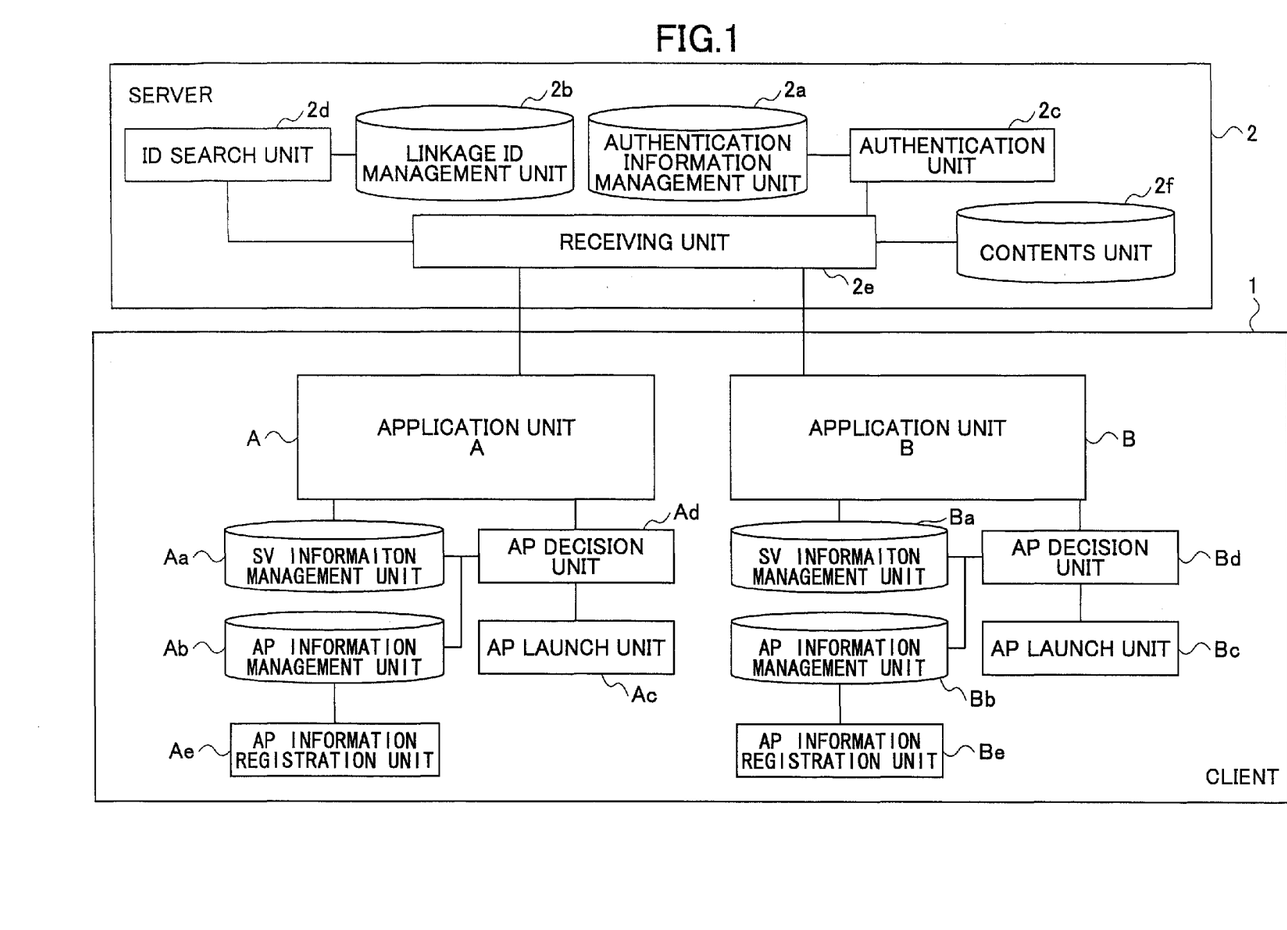
FIG. 1 is a block diagram of an authentication apparatus in an embodiment of the present invention.

Applications A and B are installed in the client apparatus 1 in FIG. 1. For example, applications A and B are browser applications that interpret and execute structured languages that are different with each other, and the application A is a BML browser and the application B is an HTML browser.

In the example shown in FIG. 1, as common application side authentication function units, each of the applications A and B is provided with a SV (Server) information management unit, an AP (Application) information management unit, an AP launch unit, an AP decision unit, and an AP information registration unit. By the way, in FIG. 1, an authentication function unit provided for the application A includes a SV information management unit Aa, an AP information management unit Ab, an AP launch unit Ac, an AP decision unit Ad, and an AP information registration unit Ae. In the same way, an authentication function unit provided for the application B includes a SV information management unit Ba, an AP information management unit Bb, an AP launching unit Bc, an AP decision unit Bd, and an AP information registration unit Be. The application side authentication function units may be included in the application. That is, as shown in FIG. 1, the application side authentication function unit may be provided in the client apparatus separately from the application. Also, the application may be configured so as to include both of the original function (such as browser) as the application and the application side authentication function, and the application may be provided in the client apparatus.

Each of the SV information management units Aa and Ba is a function unit for managing a linkage ID (information indicating connection between the client apparatus 1 and the server apparatus 2). Each of the SV information management units Aa and Ba manages the linkage ID by using a predetermined storing unit in a storage device (memory, hard disc device, for example) provided in the client apparatus 1 beforehand, for example. That is, each of the SV information management units Aa and Ba includes a storing unit that stores the linkage ID. By the way, management of the linkage ID by the SV information management unit includes storing the linkage ID received from the outside into a storing unit, and reading out the linkage ID from the storing unit based on a request from the outside.

Each of the AP information management units Ab and Bb is a function unit for managing connection information between applications (between applications A and B, for example). The connection information to be set is application information that includes application name, location information of the application, access right information, application type, and the like. Each of the AP information management units Ab and Bb manages the connection information using a predetermined storing unit in the storage device provided in the client apparatus 1 beforehand. That is, each of the AP information management units Ab and Bb includes a storing unit for storing the connection information. By the way, management of the connection information between applications by the AP information management unit includes storing the connection information received from the outside into a storing unit, and reading out the connection information from the storing unit based on a request.

The connection information may be different for each application. In addition, the client apparatus 1 may perform authentication and the like in view of security and the like when setting the connection information. The AP information management unit may be provided for each application. Or, the client apparatus may be provided with one AP information management unit, so that the AP information management unit may manage a plurality of applications collectively.

Each of the AP launch units Ac and Bc is a function unit for launching, based on a request transmitted from the server apparatus 2, an application other than an application that is being executed and that receives the request. That is, in the client apparatus 1, the AP launch unit Ac launches the application B, and the AP launch unit Bc launches the application A.

Each of the AP decision units Ad and Bd is a function unit for determining whether an application other than a corresponding application has been registered for the corresponding application. That is, the AP decision unit Ad determines whether the application B has been registered for the application A, and the AP decision unit Bd determines whether the application A has been registered for the application B.

Each of the AP information registration units Ae and Be is an interface function unit for registering application information.

In the present specification and claims, the operation executed by the application is operation based on a function realized by an application program executed on the client apparatus that is a computer.

The server apparatus 2 includes an authentication information management unit 2a, a linkage ID management unit 2b, an authentication unit 2c, an ID search unit 2d, a receiving unit 2e, and a contents unit 2f.

The authentication information management unit 2a is a function unit used when authentication information is held in the server.

The linkage ID management unit 2b has a function for issuing a linkage ID (information indicating connection between the client apparatus 1 and the server apparatus 2), and is a function unit for managing the linkage ID.

The authentication unit 2c is a function unit for inquiring whether the requestor client apparatus 1 is authenticated at an authentication mechanism (authentication unit 2c, for example) in the own server or at an external authentication mechanism when the server apparatus 2 is using the external authentication mechanism, and for returning a result.

The ID search unit 2d is a function unit for inquiring about a linkage ID at the linkage ID management unit 2b based on a linkage ID request, and for returning a result.

The receiving unit 2e is a function unit for distributing a request electronic message to the authentication unit 2c or to the contents unit 2f according to a request.

The contents unit 2f is a function unit for providing contents according to the request.

Figure 2:
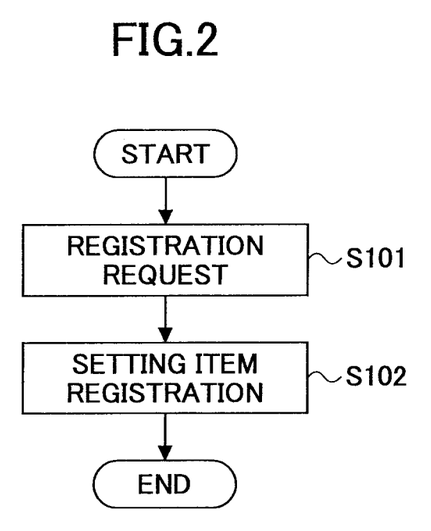
FIG. 2 is a diagram showing an example of initial registration processing for an AP information management unit in an embodiment of the present invention.

An example of initial registration processing for the AP information management unit in the present embodiment is described based on FIG. 2.

A screen for requesting registration is displayed for a user by the AP information registration unit (S101), and the user inputs information of items to be set into the client apparatus 1, so that setting of a usable application list for each application is performed (S102). By the processing in steps S101 and S102, a list of applications that can be linked is generated. The registration information may include, for example, application name, location information of application (storing location (file path) of application in the client apparatus 1, for example), access right information, application type and the like.

For example, the application B is registered in the AP information management unit Ab corresponding to the application A as an application that can be linked with the application A. Then, in this case, the name of the application B, location information of the application B, access right information of the application B and application type of the application B are registered. In addition, the application A is registered in the AP information management unit Bb corresponding to the application B as an application that can be linked with the application B. Then, in this case, the name of the application A, location information of the application A, access right information of the application A and application type of the application A are registered. By the way, it is not necessary to register application information for all applications. It is only necessary to register application information for at least one application as necessary.

That is, for example, registration is performed such that application B or application C (not shown in the figure) is usable from the viewpoint of the application A. For example, the application B is registered as an application that is a destination for sending a response when the application A is accessed (when receiving a linkage ID request, for example).

In addition, for example, in the case when the application A is registered for the application B, it means that a response may be sent to the application A when the application B is accessed from the application A. In addition, in the case when the application A is registered for the application B, it means that the application B can access the application A for obtaining the linkage ID.

By the way, the application type is an identifier for identifying processing for application. For example, by registering the application type of the application A of still image processing by using "<image>" tag, the application A can be launched by designating the "<image>" tag. Or, if any application type is not indicated in the tag, the AP launch unit launches an application by specifying an application type as a launch parameter of the application.

In addition, the setting file (registration information stored in the AP information management unit) is rewritable. The setting file may be provided for each registered application. Also, there may be a mechanism for preventing rewriting from the outside, by performing authentication when performing registration, for example. In addition, there may be a mechanism for, when registration is performed for an application, performing setting for another application automatically.

As mentioned above, in the present embodiment, the linkage ID is shared among a plurality of applications using the SV information management unit, the AP information management unit, and the AP decision unit.

Figure 3:
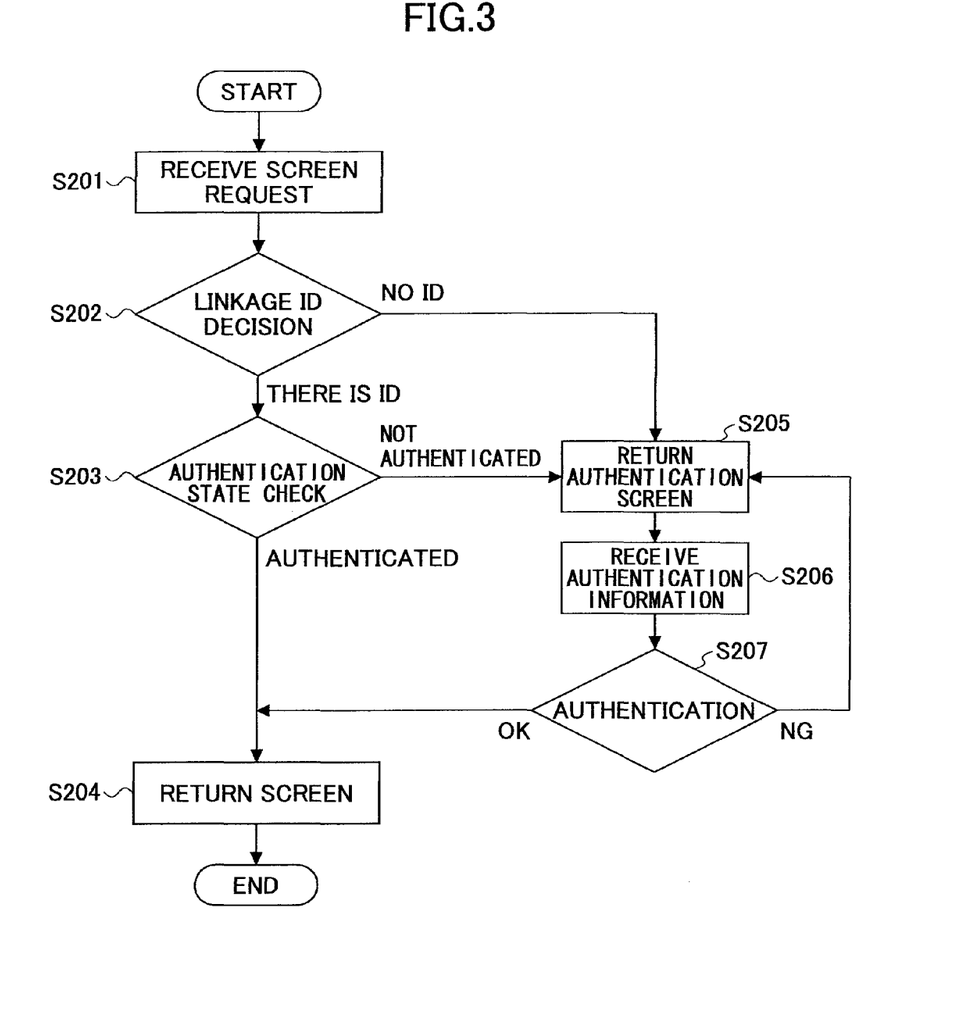
FIG. 3 is a diagram showing an example of single sign-on execution processing of the server apparatus in an embodiment of the present invention.

An example of single sign-on execution processing by the server apparatus 2 in the present embodiment is described with reference to FIG. 3. In the following description, units having reference signs the same as those in FIG. 1 are not described.

First, a screen request electronic message is issued to the server apparatus 2 from the client apparatus 1 of a requestor. The server apparatus 2 receives the screen (contents) request electronic message (S201). If the client apparatus 1 and the server apparatus 2 are already linked at this stage, the request electronic message includes a linkage ID.

Next, the server apparatus 2 searches the linkage ID management unit 2b for a linkage ID corresponding to the client apparatus 1 using the ID search unit 2d in order to specify the client apparatus 1 of the requestor, and determines presence or absence of the linkage ID based on the search result (S202). When there is the linkage ID in the linkage ID management unit 2b, the process goes to step S203. When the linkage ID does not exist, the process goes to step S205.

In step S203, the authentication unit 2c inquiries about authentication state of the client apparatus 1 at the authentication information management unit 2a. When the client apparatus 1 is authenticated, the process goes to step S204. When the client apparatus has not been authenticated, the process goes to step S205.

In step S204, the server apparatus 2 obtains a requested screen from the contents unit 2f, and returns it to the client apparatus 1.

In step S205, the authentication unit 2c of the server apparatus 2 returns an authentication request to the client apparatus 1, and the process goes to step S206.

In step S206, the authentication unit 2c of the server apparatus 2 receives authentication information (such as login message, for example) from the client apparatus 1.

Next, the authentication unit 2c of the server apparatus 2 performs authentication processing using the received authentication information (S207). When authentication succeeds, the process goes to step S204. If the authentication fails, the process goes back to step S205.

Figure 4:
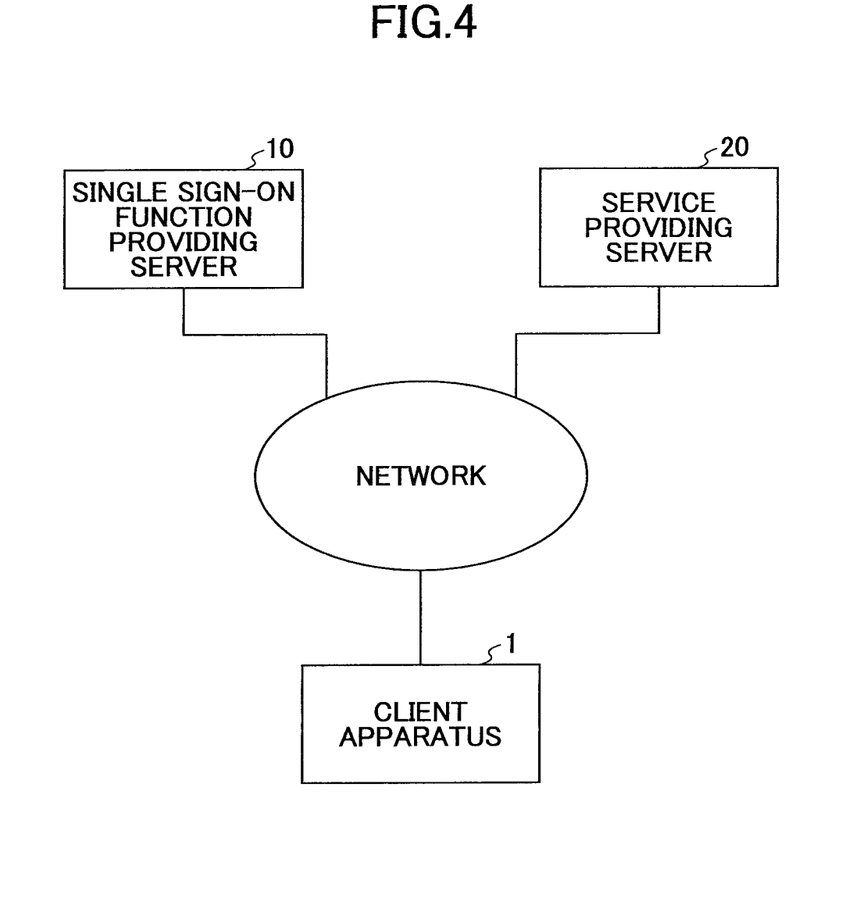
FIG. 4 is a diagram showing another example of a configuration in the server side.

Next, another example on the apparatus in the server side is described. FIG. 4 shows a system configuration in the server side in the present example. In the present example, as apparatuses in the server side, a single sign-on function providing server 10 for realizing single sign-on, and a service providing server 20 for providing services such as contents service and the like are provided. The system including the single sign-on function providing server 10 and the service providing server 20 may be called a server apparatus. By the way, although the single sign-on function providing server 10 may also provide the service such as the contents service, processing for providing the service such as contents service by the single sign-on function providing server is not shown in the following description.

Next, an example of processing is described with reference to sequence diagrams of FIGS. 5 and 6 until the service providing server 20 provides the service to the client apparatus 1 among the client apparatus 1, the single sign-on function providing server 10, and the service providing server 20. By the way, the processing itself in the server side described below is based on schemes proposed by Liberty Alliance Project, for example.

In addition, in the following, it is assumed that account information of a user of the client apparatus 1 is registered for the single sine-on function providing server in the single sine-on function providing server 10, and that account information of the user is registered for the service providing server in the service providing server 20.

First, an example of processing for performing account linkage between the single sign-on function providing server 10 and the service providing server 20 is described with reference to FIG. 5.

The client apparatus 1 accesses the single sign-on function providing server 10 based on user operation, and sends account information to the single sign-on function providing server 10 so as to login to the single sign-on function providing server 10 (step S501). The single sign-on function providing server 10 succeeds in authentication, and stores information, together with account information of the user, indicating a state that authentication has been performed by the single sign-on function providing server 10 and including identification information identifying the single sign-on function providing server 10, then, the single sign-on function providing server 10 sends the information to the client apparatus 1 (step S502).

In the client apparatus 1, the information is stored in the storing unit of the SV information management unit. When the function of the present invention is not used, the information is stored such that it is used only by an application that is being executed currently in the client apparatus 1. The information is information indicating connection between the client apparatus 1 and the single sign-on function providing server 10, and is information corresponding to the linkage ID described so far. In the following, the information is called linkage ID.

After that, the client apparatus 1 accesses the service providing server 20 and sends account information so as to login to the service providing server 20 (step S503). The service providing server 20 performs authentication (initial authentication in the service providing server 20), and succeeds in the authentication. The information for login includes the linkage ID, so that the service providing server 20 refers to the linkage ID to identify the single sign-on function providing server 10, and sends, to the client apparatus 1, a screen for asking the user whether to perform account linkage with the single sign-on function providing server 10 (step S504).

When the user of the client apparatus 1 permits account linkage, information indicating the permission is sent from the client apparatus 1 to the service providing server 20 (step S505). After that, account linkage processing is performed between the service providing server 20 and the single sign-on function providing server 10 (step S506).

In the account linkage, exchange of actual account information of the user is not performed. Instead, a user identifier (alias) is exchanged. By the account linkage, the single sign-on function providing server 10 holds account information of the user in the single sign-on function providing server 10 and the user identifier by associating them with each other, and the service providing server 20 holds account information of the user in the service providing server 20 and the user identifier by associating them with each other.

After that, the client apparatus 1 may proceed to processing for using the service of the service providing server 20, or may access another site.

Next, an example of processing until the client apparatus 1 receives the service from the service providing server 20 is described with reference to FIG. 6, in the case when the initial authentication of the user has been completed by the service providing server 20 and the account linkage has been completed as mentioned above. The processing described here is so called processing of single sign-on. Only by performing login to the single sign-on function providing server 10 by the user, the user can receive the service of the service providing server 20 without performing login authentication at the service providing server 20.

Figure 5:
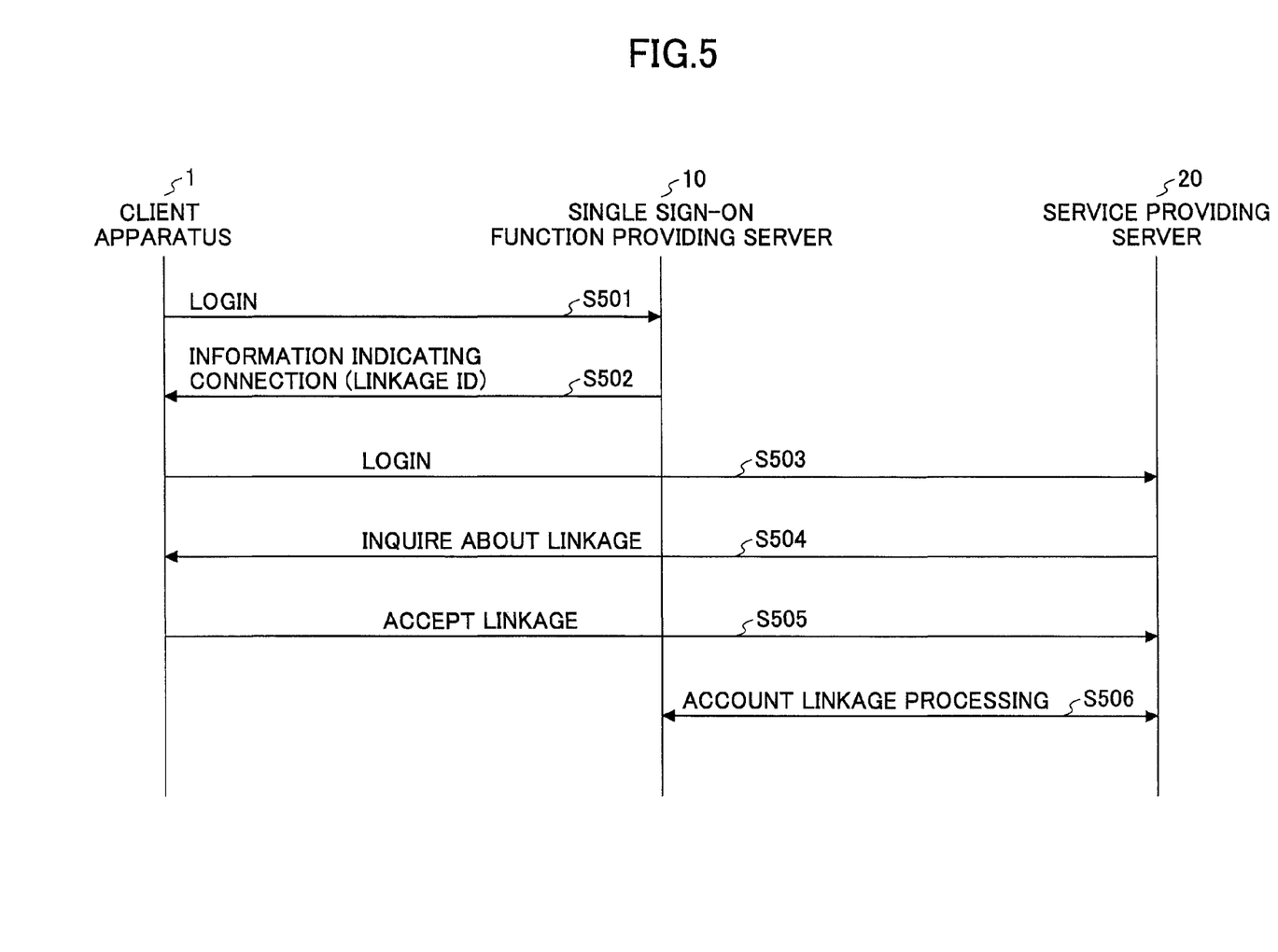
FIG. 5 is a diagram showing an example of processing until account linkage is performed in the configuration shown in FIG. 4.
Figure 6:
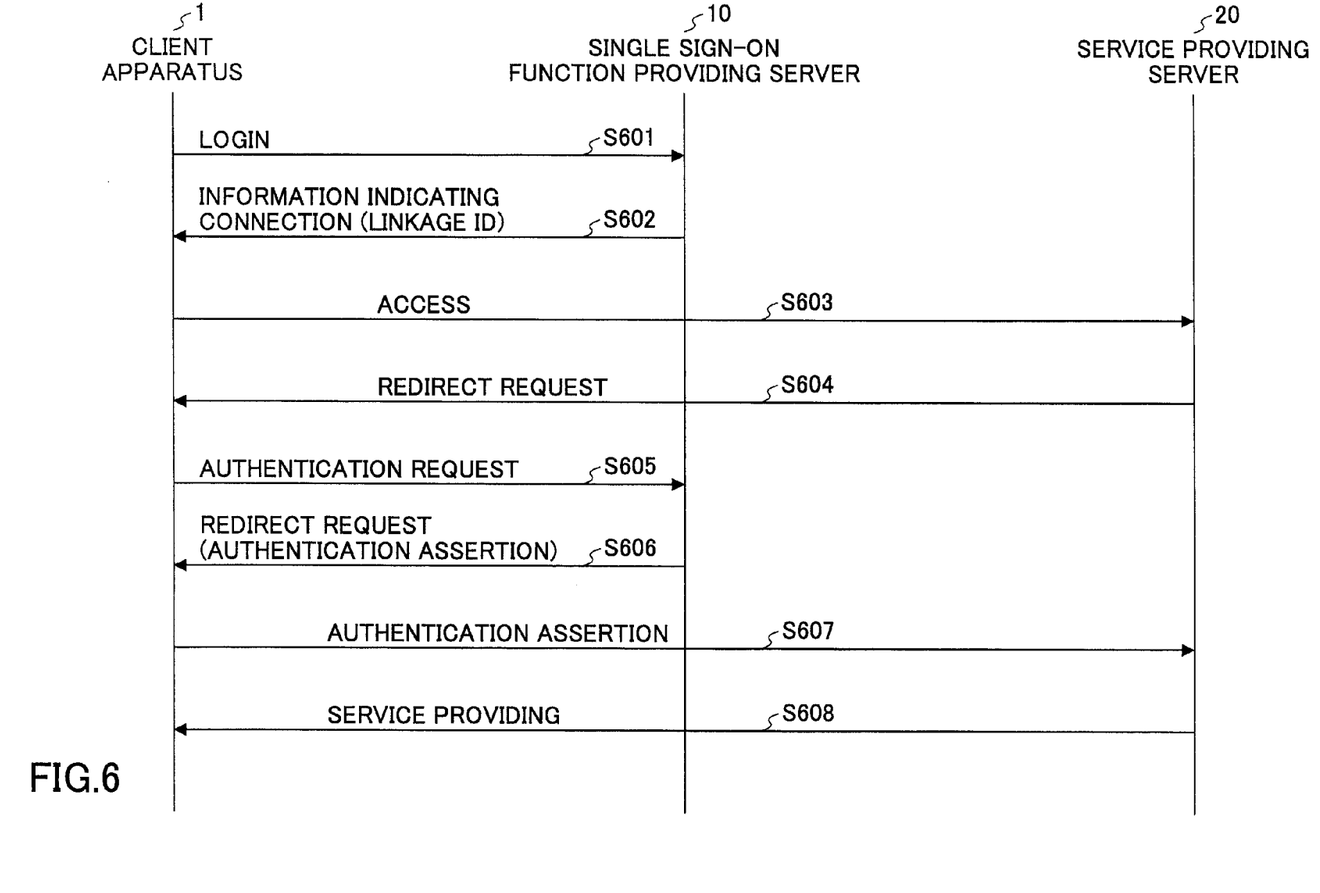
FIG. 6 is a diagram showing an example of processing for performing single sign-on in the configuration shown in FIG. 4.

In step S601 of FIG. 6, the client apparatus 1 logs in to the single sign-on function providing server 10 in the same way in step S501 of FIG. 5. Then, in the same way as step S502 in FIG. 5, the linkage ID is sent from the single sign-on function providing server 10 to the client apparatus 1 (step S602).

At this time, for example, a link to the service providing server 20 is described on a screen displayed on the client apparatus 1 by the single sign-on function providing server 10, so that the user selects the link, then, the client apparatus 1 accesses the service providing server 20 (step S603). The linkage ID is included in information sent from the client apparatus 1 to the service providing server 20. The service providing server 20 sends, to the client apparatus 1, a redirect request that instructs the client apparatus 1 to send authentication request to the single sign-on function providing server 10 that is identified by the linkage ID (step S604). The client apparatus 1 that received the redirect request sends an authentication request including the linkage ID to the single sign-on function providing server 10 (step S605).

The single sign-on function providing server 10 identifies the account of the user by the linkage ID, obtains the user identifier (alias), and sends, to the service providing server 20 via the client apparatus 1, authentication assertion information including the user identifier and indicating that authentication is confirmed (steps S606 and S607). The service providing server 20 confirms that the user is authenticated by the authentication assertion information, so as to start providing the service (step S608).

In the above example, the client apparatus 1 includes a function unit for sending the authentication request to the single sign-on function providing server 10, and a function unit for receiving the linkage ID from the single sign-on function providing server 10 when authentication for the authentication request succeeds in the single sign-on function providing server 10. These function units are realized by an authentication program executed in the client apparatus 1.

In the example shown in FIG. 6, for example, login to the single sign-on function providing server 10 is performed using the application A in the client apparatus 1, so that the linkage ID is obtained. The linkage ID is managed by the SV information management unit corresponding to the application A. Then, for example, in the case when the application A cannot use a service provided by the service providing server 20, the application B that can user the service is launched, and the application B obtains the linkage ID from the application A side. Then, the application B accesses the service providing server 20, so that the application B can receive the service without performing login authentication for the service providing server 20. The launch of the application B may be performed by the application A.

Of course, the scheme of single sign-on that can be applied to the present invention is not limited to the scheme described so far. As the scheme of single sign-on that can be applied to the present invention, any scheme can be used as long as single sign-on is performed by using information indicating connection between the client apparatus 1 and the server side.

Figure 7:
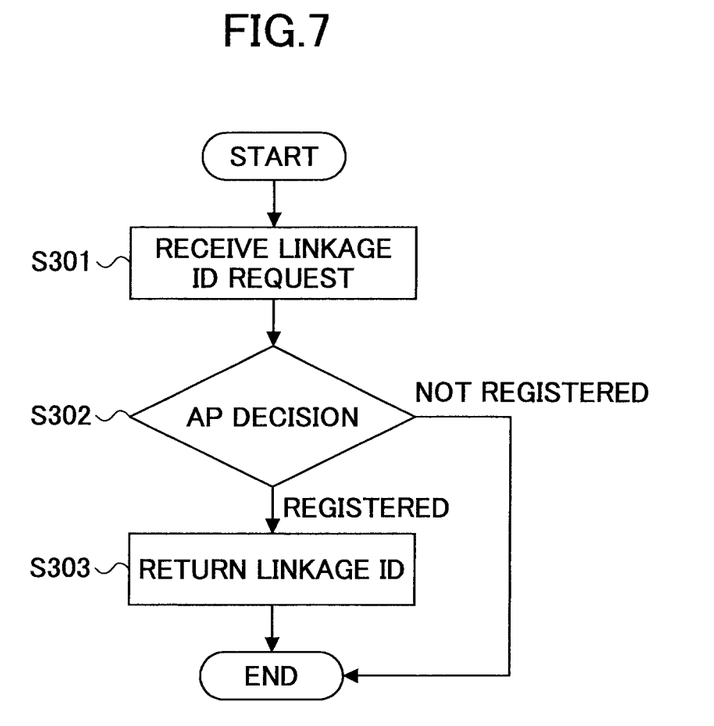
FIG. 7 is a diagram showing an example of linkage processing between applications in the client apparatus in an embodiment of the present invention.

An example of linkage processing between applications in the client apparatus of the present embodiment is described based on FIG. 7. In the following description, units having reference signs the same as those in FIG. 1 are not described.

For example, when the application B is launched by the application A as mentioned above, the application B can identify the application A that launched the application B. When the application B needs the linkage ID, the application B sends a linkage ID request to an application that has performed authentication at the server apparatus 2 (that is the application A that has obtained the linkage ID from the server apparatus 2).

First, the AP decision unit Ad corresponding to the application A installed in the client apparatus 1 receives the linkage ID request from the application B side (S301). By the way, the application B itself may be provided with a function for sending the linkage ID request, or the application side authentication function unit of the application B may be provided with a function for sending the linkage ID request. Then, the AP decision unit Ad determines whether the application B is registered based on the received linkage ID request (S302). For example, if an application name (that is, an application name of the application B) included in the linkage ID request is registered in the AP information management unit Ab, the AP decision unit Ad determines that the application B is registered. If the application name included in the linkage ID request is not registered in the AP information management unit Ab, the application B is determined to be unregistered. When the application B is registered (that is, when the request is from a registered application (application B, for example)), the AP decision unit Ad sends a search request to the SV information management unit Aa, and the process goes to step S303. When the application is unregistered (that is, when the linkage ID request is from an unregistered application), the processing ends, or an error is returned. When returning an error, for example, the AP decision unit Ad sends the error to the application B, and the application B displays a message indicating the error and the like.

In step S303, the AP decision unit Ad returns a result (linkage ID, for example) for the search request to the requestor application (application B, for example).

Then, the application B that received the linkage ID stores it in a storing unit in the SV information management unit Ba, and sends the linkage ID to the server apparatus 2. When authenticated information is sent from the server apparatus 2, the application B completes sign-on.

It is not necessary to provide the application side authentication function unit (that are SV information management unit, AP information management unit, AP decision unit, AP launch unit, and AP information registration unit) for each application. In addition, in the example shown in FIG. 1, although all function units of the application side authentication function units are placed outside the application, a part of the application side authentication functions may be placed outside the application and remaining functions may be placed inside the application.

Figure 8:
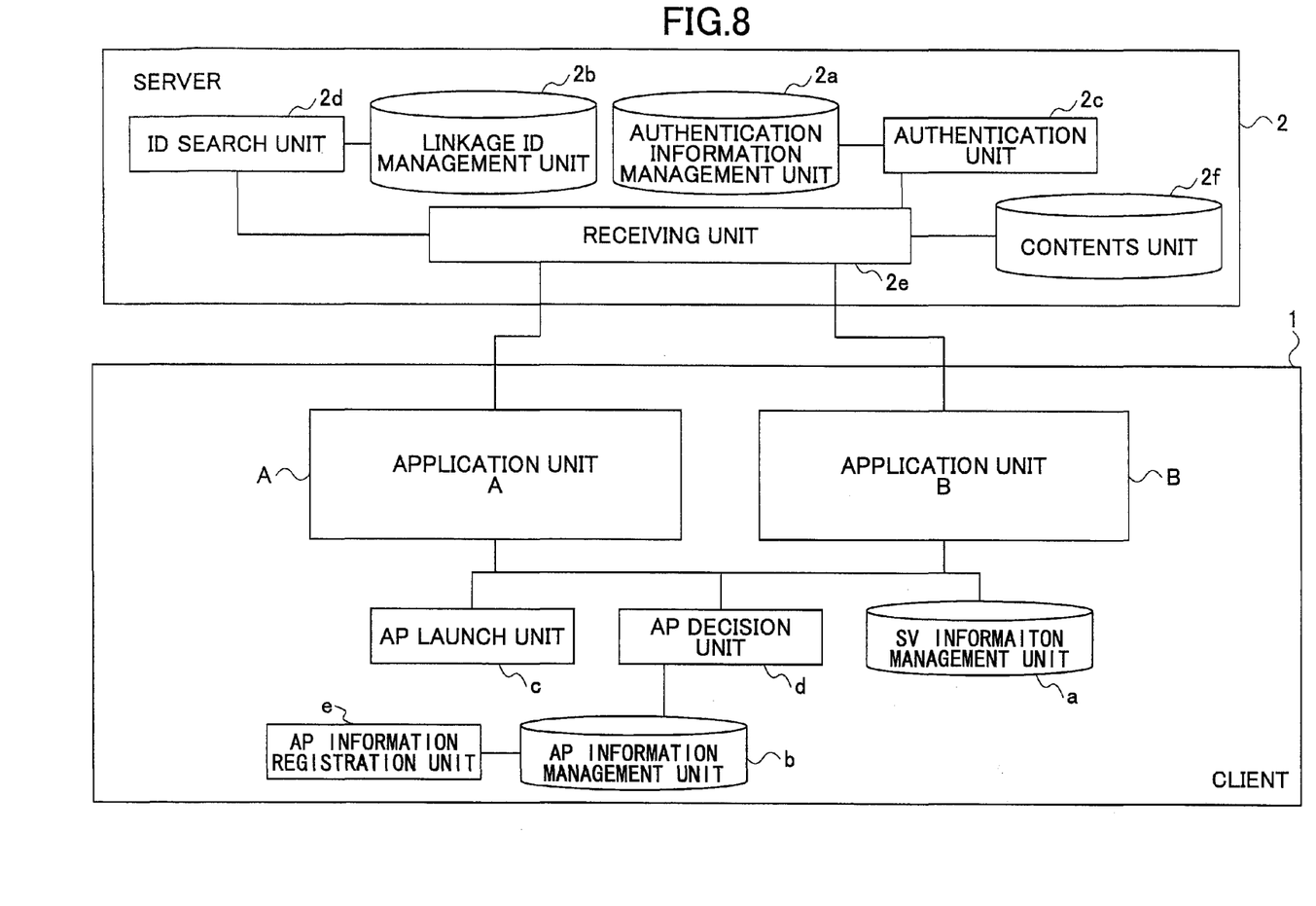
FIG. 8 is a diagram showing a case in which the application side authentication function units are placed outside the application, and are shared by a plurality of applications in an embodiment of the present invention.

A configuration example is described based on FIG. 8 in which the application side authentication function units are placed outside the application, and are shared by a plurality of applications. In this configuration example, a plurality of applications share the SV information management unit, the AP information management unit, the AP decision unit and the linkage ID. In this case, for example, the storing unit in the SV information management unit stores a linkage ID for each application, and a storing unit of the AP information management unit stores application information for each application. Then, for example, in the case when the linkage ID for the application A is stored in the SV information management unit, for obtaining the linkage ID by the application B, the AP decision unit receives the linkage ID request from the application B and searches an area corresponding to the application A in the storing unit of the AP information management unit so as to obtain application information. Processing after that is the same as that described before.

In addition, for example, the SV information management unit, the AP information management unit and the AP decision unit may be provided for an application (for example, only for the application A in the applications A and B), so that another application may perform procedure and communication on the linkage ID for the application.

It is assumed that applications A and B are installed in the client apparatus 1 shown in FIG. 8. For example, the client apparatus 1 can be assumed to be a set-top box. The applications A and B are browser applications that interpret and execute structured languages that are different with each other. For example, the application A is an HTML browser and the application B is a BML browser.

For example, as a storing unit of each of the SV information management unit a and the AP information management unit b, an external memory such as IC (integrated circuit) card, SD (Secure Digital) memory card and the like, or an internal memory area of Java (registered trademark) application and the like can be used.

The authentication system and the authentication apparatus in the embodiment, or, a part of units or all functions of the authentication system and the authentication apparatus can be configured by a program of a computer, so that the present invention can be realized by executing the program on the computer. In addition, procedures of processing in the authentication system and the authentication apparatus of the embodiment can be configured by a program of a computer so that the program can be executed on the computer.

As mentioned above, according to the present embodiment, it becomes possible to realize single sign-on in communication between the BML browser and the HTML browser for existing broadcast services. Therefore, convenience of the user can be improved.

In the above description, although concrete examples are described in detail, it is apparent for a person skilled in the art that various modifications and changes are available within the scope of technical thoughts of the present invention, and it is a matter of course that such modifications and changes fall within the scope of the claims.

For example, as a modification of the present embodiment, each of the SV information management unit and the AP information management unit may be realized by using a general purpose database.

The invention claimed is:

1. A client apparatus, including a client function in a network, in which a plurality of Web browsing applications for performing single sign-on to a first server apparatus that provides a single sign-on function are installed, comprising:
an application information management unit that stores registration information of a second Web browsing application of the plurality of Web browsing applications, the registration information indicating that the second Web browsing application can be linked with a first Web browsing application of the plurality of Web browsing applications;
a server information management unit that stores a linkage ID which indicates a current connection between the client apparatus and the first server apparatus, the client apparatus being configured to transmit the linkage ID to a second server apparatus to permit the second server apparatus to perform account linkage with the first server apparatus;
an application decision unit configured to share the linkage ID, stored in the server information management unit, with the second Web browsing application, after the first Web browsing application has performed a login authentication procedure with the first server apparatus, and the application decision unit determines that the second Web browsing application can be linked with a first Web browsing application based on the stored registration information, the client apparatus being configured to send the linkage ID to the second server apparatus to allow the second Web browsing application to receive service from the second server apparatus without the second Web browsing application performing a login authentication procedure with the second server apparatus.

2. The client apparatus as claimed in claim 1, wherein the server information management unit, the application information management unit and the application decision unit are shared by the plurality of Web browsing applications.

3. The client apparatus as claimed in any one of claims 1 or 2, wherein the first server apparatus includes a single sign-on function providing unit configured to issue the linkage ID, and the client apparatus further comprising:
a unit configured to send an authentication request to the single sign-on function providing unit; and
a unit configured to receive the linkage ID from the single sign-on function providing unit when the single sign-on function providing unit succeeds in authentication for the authentication request.

4. An authentication method in which a plurality of Web browsing applications are installed in a client apparatus having a client function in a network, and the installed applications perform single sign-on to a first server apparatus that provides a single sign-on function, comprising:
storing, at an application information management unit, registration information of a second Web browsing application of the plurality of Web browsing applications, the registration information indicating that the second Web browsing application can be linked with a first Web browsing application of the plurality of Web browsing applications;
storing, at a server information management unit, a linkage ID which indicates a current connection between the client apparatus and the first server apparatus, the client apparatus transmitting the linkage ID to a second server apparatus to permit the second server apparatus to perform account linkage with the first server apparatus;
sharing, by an application decision unit, the linkage ID, stored in the server information management unit, with the second Web browsing application, after the first Web browsing application has performed a login authentication procedure with the first server apparatus, and the application decision unit determines that the second Web browsing application can be linked with a first Web browsing application based on the stored registration information, the client apparatus sending the linkage ID to the second server apparatus to allow the second Web browsing application to receive service from the second server apparatus without the second Web browsing application performing a login authentication procedure with the second server apparatus.

5. The authentication method as claimed in claim 4, comprising a step of using, commonly by the plurality of Web browsing applications, the server information management unit, the application information management step and the application decision step.

6. The authentication method as claimed in any one of claims 4 and 5, the server apparatus including a single sign-on function providing unit configured to issue the linkage ID, and the authentication method comprising:
a step of sending an authentication request to the single sign-on function providing unit; and
a step of receiving the linkage ID from the single sign-on function providing unit when the single sign-on function providing unit succeeds in authentication for the authentication request.

7. A non-transitory computer readable medium storing a program for causing a client apparatus, including a client function in a network, in which a plurality of Web browsing applications for performing single sign-on to a first server apparatus that provides a single sign-on function are installed, to function as:
an application information management unit that stores registration information of a second Web browsing application of the plurality of Web browsing applications, the registration information indicating that the second Web browsing application can be linked with a first Web browsing application of the plurality of Web browsing applications;

a server information management unit that stores a linkage ID which indicates a current connection between the client apparatus and the first server apparatus, the client apparatus being configured to transmit the linkage ID to a second server apparatus to permit the second server apparatus to perform account linkage with the first server apparatus;

an application decision unit configured to share the linkage ID, stored in the server information management unit, with the second Web browsing application, after the first Web browsing application has performed a login authentication procedure with the first server apparatus, and the application decision unit determines that the second Web browsing application can be linked with a first Web browsing application based on the stored registration information, the client apparatus being configured to send the linkage ID to the second server apparatus to allow the second Web browsing application to receive service from the second server apparatus without the second Web browsing application performing a login authentication procedure with the second server apparatus.

8. The non-transitory computer readable medium as claimed in claim 7, the server apparatus including a single sign-on function providing unit configured to issue the linkage ID, the program causing the client apparatus to further function as:

a unit configured to send an authentication request to the single sign-on function providing unit; and a unit configured to receive the linkage ID from the single sign-on function providing unit when the single sign-on function providing unit succeeds in authentication for the authentication request.

* * * * *